United States Patent
Muranaka

(10) Patent No.: US 8,825,331 B2
(45) Date of Patent: Sep. 2, 2014

(54) TRAVELLING VEHICLE

(75) Inventor: Takeshi Muranaka, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 14/112,553

(22) PCT Filed: Mar. 7, 2012

(86) PCT No.: PCT/JP2012/055779
§ 371 (c)(1),
(2), (4) Date: Oct. 18, 2013

(87) PCT Pub. No.: WO2012/144278
PCT Pub. Date: Oct. 26, 2012

(65) Prior Publication Data
US 2014/0039769 A1 Feb. 6, 2014

(30) Foreign Application Priority Data
Apr. 20, 2011 (JP) ................ 2011-094009

(51) Int. Cl.
*B60T 8/17* (2006.01)
*B60T 8/32* (2006.01)
*B60T 13/66* (2006.01)
*B65G 1/04* (2006.01)

(52) U.S. Cl.
CPC ........... *B60T 8/321* (2013.01); *B60T 13/662* (2013.01); *B60T 8/17* (2013.01); *B65G 1/0421* (2013.01)
USPC ................ 701/70; 701/50; 188/1.11 R

(58) Field of Classification Search
CPC ............ G05B 19/416; G05B 19/4103; G05B 19/4163; B65H 2511/22; B65H 2513/21
See application file for complete search history.

(56) References Cited

U.S. PATENT DOCUMENTS

| | | | |
|---|---|---|---|
| 6,412,885 B1 | 7/2002 | Shirai et al. | |
| 2006/0049783 A1* | 3/2006 | Taguchi | 318/69 |
| 2009/0145698 A1* | 6/2009 | Kondo et al. | 187/288 |
| 2011/0109257 A1* | 5/2011 | Someya | 318/626 |

FOREIGN PATENT DOCUMENTS

| | | |
|---|---|---|
| JP | 05-115108 A | 5/1993 |
| JP | 2002-271916 A | 9/2002 |
| JP | 2008-100773 A | 5/2008 |
| JP | 2009-081919 A | 4/2009 |

OTHER PUBLICATIONS

Official Communication issued in International Patent Application No. PCT/JP2012/055779, mailed on May 1, 2012.
English translation of Official Communication issued in corresponding International Application PCT/JP2012/055779, mailed on Oct. 24, 2013.

* cited by examiner

*Primary Examiner* — John R Olszewski
*Assistant Examiner* — Nicholas K Wiltey
(74) *Attorney, Agent, or Firm* — Keating & Bennett, LLP

(57) ABSTRACT

In a stacker crane, servomotors are travel motors causing a vehicle main body to travel, and include brakes. A travel controller includes a malfunction detecting unit to detect malfunctions in the servomotors, and a deceleration pattern storage unit to store deceleration patterns based on combinations of some of the servomotors. If a malfunction with a servomotor is detected by the malfunction detecting unit, the malfunctioning servomotor is no longer subject to deceleration control, a deceleration pattern including a combination of normal servomotors is read from the deceleration pattern storage unit, and then braking control is performed by using this deceleration pattern.

3 Claims, 6 Drawing Sheets

65a

| 1 | 2 | 3 | 4 | 5 | Deceleration that can be generated |
|---|---|---|---|---|---|
| malfunction | normal | normal | normal | normal | 0.66G |
| normal | malfunction | normal | normal | normal | 0.66G |
| normal | normal | malfunction | normal | normal | 0.66G |
| normal | normal | normal | malfunction | normal | 0.66G |
| normal | normal | normal | normal | malfunction | 0.66G |
| malfunction | malfunction | normal | normal | normal | 0.4G |
| malfunction | normal | malfunction | normal | normal | 0.4G |
| malfunction | normal | normal | malfunction | normal | 0.4G |
| malfunction | normal | normal | normal | malfunction | 0.4G |
| normal | malfunction | malfunction | normal | normal | 0.4G |
| normal | malfunction | normal | malfunction | normal | 0.4G |
| normal | malfunction | normal | normal | malfunction | 0.4G |
| normal | normal | malfunction | malfunction | normal | 0.4G |
| normal | normal | malfunction | normal | malfunction | 0.4G |
| normal | normal | normal | malfunction | malfunction | 0.4G |
| malfunction | malfunction | malfunction | normal | normal | 0.2G |
| malfunction | malfunction | normal | malfunction | normal | 0.2G |
| malfunction | normal | malfunction | malfunction | normal | 0.2G |
| normal | malfunction | malfunction | malfunction | normal | 0.2G |
| malfunction | malfunction | normal | normal | malfunction | 0.2G |
| malfunction | normal | malfunction | normal | malfunction | 0.2G |
| normal | malfunction | malfunction | normal | malfunction | 0.2G |
| malfunction | normal | normal | malfunction | malfunction | 0.2G |
| normal | malfunction | normal | malfunction | malfunction | 0.2G |
| normal | normal | malfunction | malfunction | malfunction | 0.2G |

FIG. 5

TRAVELLING VEHICLE

BACKGROUND OF THE INVENTION

1. Field of the Invention

The present invention relates to a travelling vehicle, and more particularly relates to a travelling vehicle in which a plurality of servomotors are used as travel motors.

2. Description of the Related Art

An example of a known conveyance vehicle that performs automatic travel is a stacker crane used in an automated warehouse.

For example, a conventional automated warehouse has a pair of racks provided a specific distance apart in a front and back direction, a stacker crane provided movably in the left and right direction between the racks, an unloading station located to the side of one of the racks, and a loading station located to the side of the other rack. The racks have numerous article holding shelves extending in the vertical and horizontal directions. The stacker crane has a travelling vehicle, a hoist that can move up and down a mast provided to this vehicle, and a article movement apparatus provided thereto (such as a slide fork provided so as to slide back and forth) (see, for example, Japanese Laid-Open Patent Application 2008-100773).

With the stacker crane described in Japanese Laid-Open Patent Application 2008-100773, a total of four servomotors are used as travel motors.

In the past, a simple power supply cut-off was performed to actuate the mechanical brakes of the servomotors and thereby stop the stacker crane. However, in multi-axis travel using a plurality of travel-use servomotors, it was difficult to balance the torque of the mechanical brakes of the servomotors, and when the brakes were actuated on all axes at the same time, the mechanical structure was sometimes subjected to an excessive load. On the other hand, a stacker crane moves at high speed and high acceleration, and therefore the control deceleration torque produced by the servo drivers is higher than the deceleration torque obtained with the mechanical brakes of the servomotors.

One possible method for dealing with this problem is to shut off the power after stopping under deceleration control by the servo drivers (stopping category 1). However, if a malfunction occurs in a servo driver, it may not be possible to stop under deceleration control.

SUMMARY OF THE INVENTION

Preferred embodiments of the present invention stop a travelling vehicle that is being moved by a plurality of servomotors, safely and in a short distance, even when a malfunction occurs in one or more of the servomotors.

In the below, a plurality of elements, features and characteristics of various preferred embodiments of the present invention will be explained. These elements, features and characteristics can be combined arbitrarily as desired.

A travelling vehicle according to a preferred embodiment of the present invention includes a vehicle main body, a plurality of servomotors, and a controller. The plurality of servomotors are configured to move the vehicle main body. Each of the servomotors includes a brake. The controller is configured and programmed to control the servomotors. The controller includes a malfunction detection unit and a deceleration pattern storage unit. The malfunction detection unit is configured and programmed to detect malfunction of the servomotors. The deceleration pattern storage unit is configured and programmed to store a plurality of deceleration patterns including a combination of a portion of the servomotors among the plurality of the servomotors. When the malfunction detection unit detects malfunction of at least one of the servomotors, the controller excludes an abnormal servomotor with the malfunction as targets to be controlled, reads out a deceleration pattern including normal servomotors from the deceleration pattern storage unit, and then performs a brake control using the read-out deceleration pattern. The phrase "malfunction of a servomotor" encompasses a malfunction of a device that affects the operation of a servomotor, such as a servo amplifier, as well as a malfunction of a servomotor itself, for example.

With this travelling vehicle, which travels with the help of a plurality of servomotors, when a malfunction occurs in one or more of the servomotors, the problematic servomotor is no longer subject to deceleration control, a deceleration pattern including a combination of normal servomotors is read, and braking control is performed according to this deceleration pattern. Therefore, the travelling vehicle can be stopped safely and in a short distance.

The brakes may be mechanical brakes, for example. The controller determines whether a deceleration pattern exists or not that has a deceleration higher than that to be obtained by the mechanical brakes, and then selects either deceleration control using the mechanical brakes or deceleration control using the deceleration pattern, which can generate a higher deceleration, to perform a brake control.

With this travelling vehicle, braking control is performed with the mechanical brakes when the deceleration produced by the mechanical brakes is higher than the deceleration in deceleration control using the deceleration pattern. That is, the controller can be stopped in the shortest distance for a given situation by selecting the braking element or brake that is capable of generating the highest deceleration in that situation.

The plurality of deceleration patterns include a balanced deceleration pattern including a combination of the servomotors other than a servomotor causing unbalance of travelling of the vehicle main body. In a case that the controller reads out the balanced deceleration pattern from the storage section, the controller performs a brake control using servomotors included in the balanced deceleration pattern, while excluding the servomotor causing unbalance of the travelling of the vehicle main body as targets to be controlled.

With this travelling vehicle, even normal servomotors are excluded from control if they upset the balance, which improves balance and as a result prevents the vehicle main body from being subjected to an excessive load.

A travelling vehicle according to another preferred embodiment of the present invention includes a vehicle main body, a plurality of servo-drivers, and a controller. Each of the plurality of servo-drivers includes a servomotor to move the vehicle main body and a servo-amplifier corresponding to the servomotor. Each of the servomotors includes a mechanical brake, for example. The controller is configured and programmed to control the servo-drivers.

The controller is programmed to read out deceleration patterns including normal servo-drivers when receiving signals indicating malfunction of the servo-drivers.

The controller is programmed to determine which is higher between a deceleration based on the read-out deceleration pattern and a deceleration based on the mechanical brakes.

The controller is programmed to activate the mechanical brakes by shutting off power of the servomotors if the deceleration based on the mechanical brakes is higher, The controller turns off the servomechanism of an abnormal servo-driver with the malfunction while keeping the mechanical brake of the servomotor included in the abnormal servo-driver in a released state, and generates a speed instruction defined by the read-out deceleration pattern if the deceleration based on the read-out deceleration pattern is higher.

With this travelling vehicle, braking control is performed with the mechanical brakes if the deceleration produced by the mechanical brakes is higher than the deceleration in deceleration control using the deceleration pattern. That is, the controller can be stopped in the shortest distance for a given situation by selecting the braking device or brake that is capable of generating the highest deceleration in that situation.

A travelling vehicle according to various preferred embodiments of the present invention can be stopped safely and in a short distance even if a malfunction should occur in one or more of the servomotors.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a table of deceleration pattern lists.

DETAILED DESCRIPTION OF THE PREFERRED EMBODIMENTS

Figure 1:
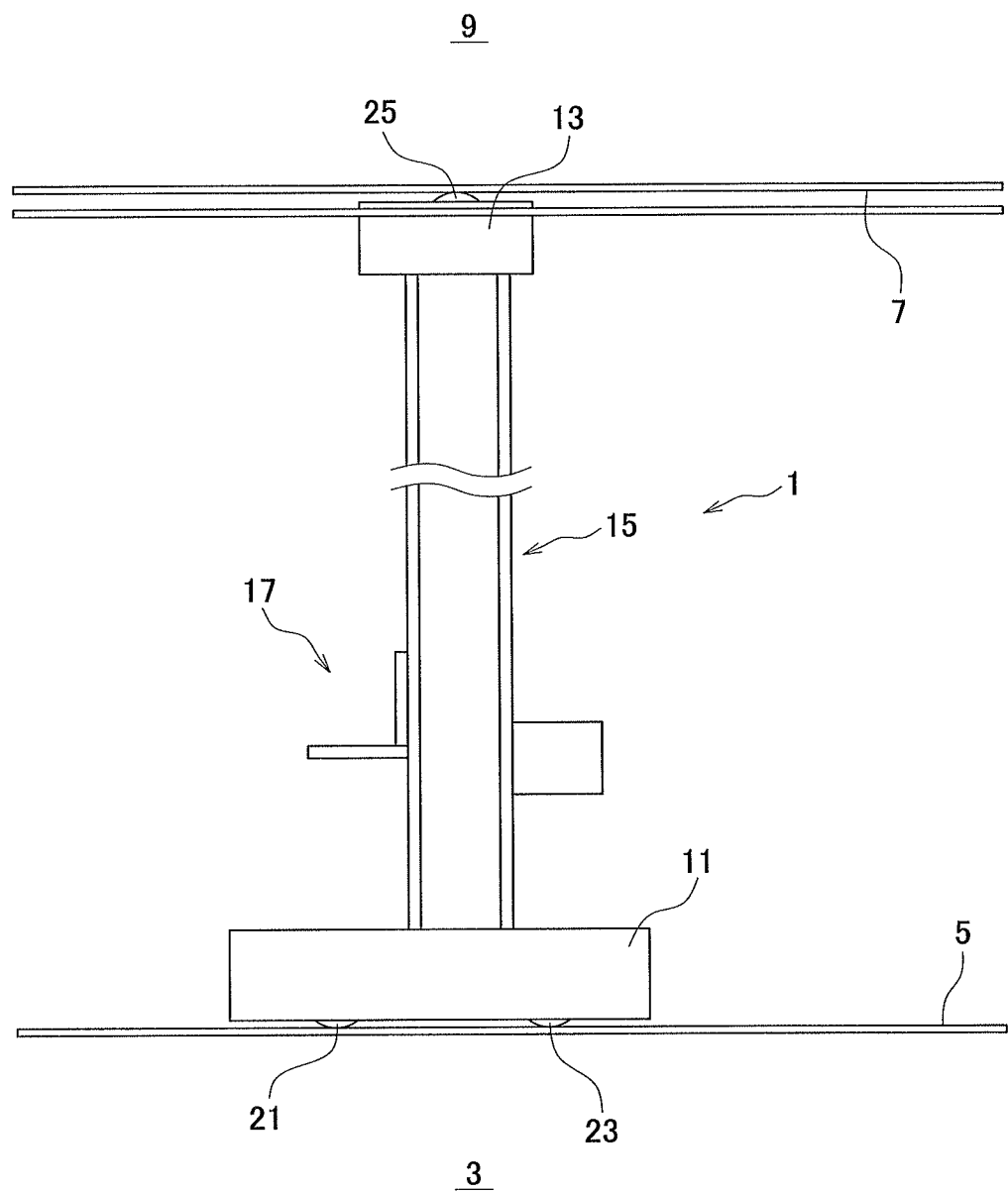
FIG. 1 is a simplified side view of a stacker crane in a preferred embodiment of the present invention.

A simplified configuration of a stacker crane 1 will be described through reference to FIG. 1. FIG. 1 is a simplified side view of a stacker crane according to a preferred embodiment of the present invention. The stacker crane 1 is able to travel in the vicinity of racks in an automated warehouse (not shown).

A lower rail 5 and an upper rail 7 are provided along a path along which the stacker crane 1 travels. The stacker crane 1 is able to move to the right and left in FIG. 1 along the lower rail 5 and upper rail 7. The lower rail 5 is disposed on a floor 3. The upper rail 7 is fixed to a ceiling 9.

As shown in FIG. 1, the stacker crane 1 preferably includes a travelling vehicle 11, a mast 15 provided to the travelling vehicle 11, and a hoist 17 mounted so that it can move up and down on the mast 15. The stacker crane 1 further includes an upper vehicle 13 provided to the upper portion of the mast 15.

The travelling vehicle 11 includes a first wheel 21 and a second wheel 23. The first wheel 21 and the second wheel 23 are aligned front and back in the travel direction, and are in contact with the lower rail 5. The upper vehicle 13 includes a third wheel 25. The third wheel 25 is in contact with the upper rail 7.

Figure 2:
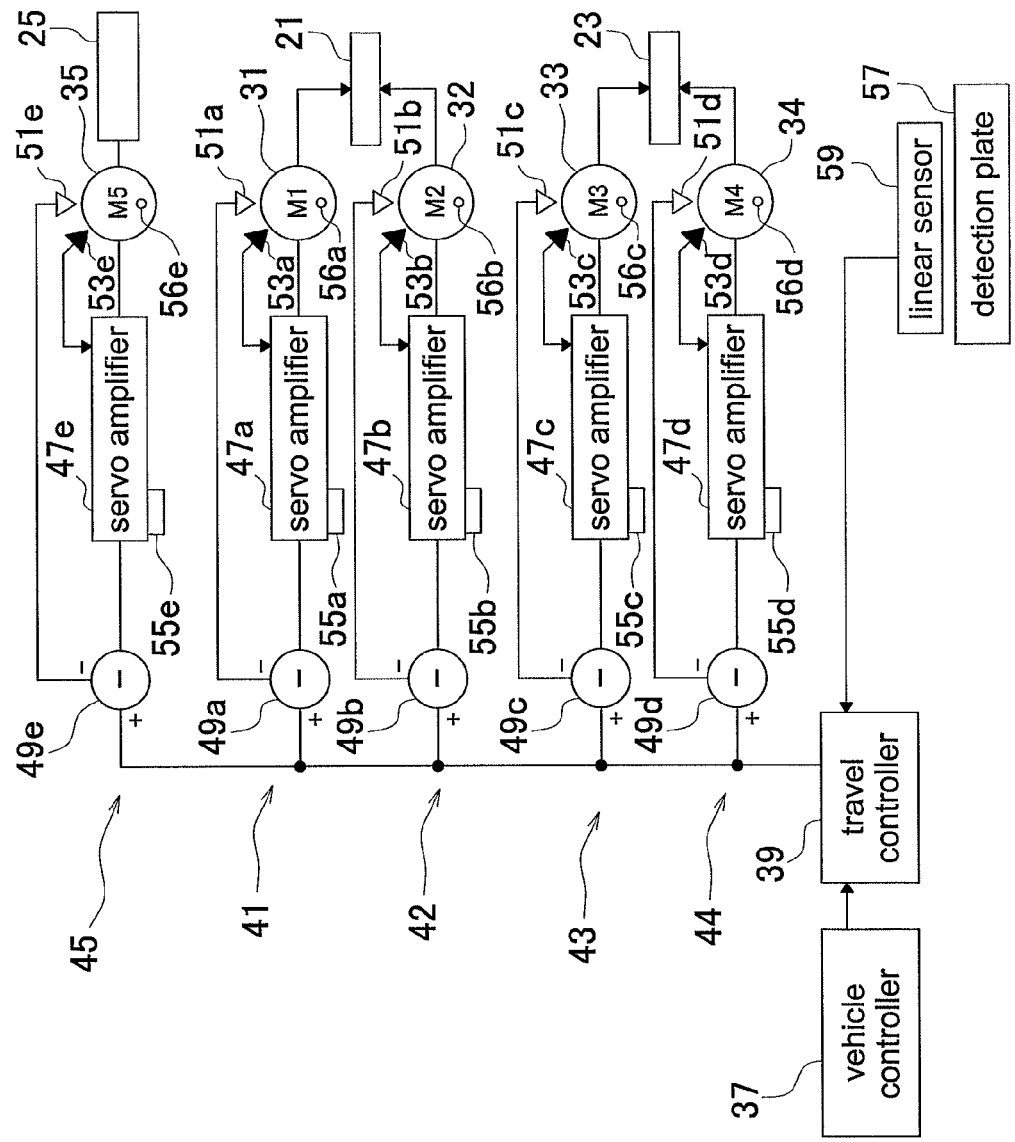
FIG. 2 is a block diagram of the servomotor control system in a stacker crane.

A travel control system of the stacker crane 1 will be described through reference to FIG. 2. FIG. 2 is a block diagram of the servomotor control system of the stacker crane.

The travel control system of the stacker crane 1 includes a travel controller 39. The travel controller 39 preferably is a computer that executes programs, and consists of a CPU, RAM, ROM, etc. Upon receiving a conveyance command from a vehicle controller 37, the travel controller 39 sends a travel command to servo drivers (discussed below) each including a servomotor.

The travel control system of the stacker crane 1 preferably includes a first servomotor 31, a second servomotor 32, a third servomotor 33, a fourth servomotor 34, and a fifth servomotor 35. The first servomotor 31 and the second servomotor 32 drive the first wheel 21, and the third servomotor 33 and the fourth servomotor 34 drive the second wheel 23. The fifth servomotor 35 drives the third wheel 25. The first servomotor 31 and the third servomotor 33 are disposed front and back on one side (left or right), and the second servomotor 32 and the fourth servomotor 34 are disposed front and back on the other side.

A first brake 56a, a second brake 56b, a third brake 56c, a fourth brake 56d, and a fifth brake 56e are provided to the servomotors 31 to 35, respectively. These brakes preferably are electromagnetic brakes built into the motors, and stop the motors by generating deceleration torque when the power is switched off. These brakes preferably are mechanical brakes, for example.

The travel control system of the stacker crane 1 further includes a first servo amplifier 47a, a second servo amplifier 47b, a third servo amplifier 47c, a fourth servo amplifier 47d, and a fifth servo amplifier 47e. The servo amplifiers send the servomotors speed commands with amplified current.

A first malfunction detecting unit 55a, a second malfunction detecting unit 55b, a third malfunction detecting unit 55c, a fourth malfunction detecting unit 55d, and a fifth malfunction detecting unit 55e are provided to the servo amplifiers 47a to 47e, respectively. The malfunction detecting units can detect malfunctions with a servo amplifier control circuit and the corresponding servomotor, and when a malfunction has been detected, they send a malfunction detection signal to the travel controller 39.

The travel control system of the stacker crane 1 further includes a first encoder 51a, a second encoder 51b, a third encoder 51c, a fourth encoder 51d, and a fifth encoder 51e. The encoders 51a to 51e detect the revolutions of the servomotors 31 to 35, respectively, and thus determine the current position and speed of the servomotors 31 to 35.

The travel control system of the stacker crane 1 further includes a first torque sensor 53a, a second torque sensor 53b, a third torque sensor 53c, a fourth torque sensor 53d, and a fifth torque sensor 53e. The torque sensors 53a to 53e preferably are current sensors, for example, and determine the power consumption and output torque of the servomotors 31 to 35. Minor loops are provided between the servomotors 31 to 35 and the servo amplifiers 47a to 47e via the torque sensors 53a to 53e, respectively, which controls the servomotors 31 to 35 so that the target torque is generated.

The travel control system of the stacker crane 1 further includes a first error amplifier 49a, a second error amplifier 49b, a third error amplifier 49c, a fourth error amplifier 49d, and a fifth error amplifier 49e. The error amplifiers 49a to 49e determine the errors between the speed signal produced by the travel controller 39 and the speed signal determine from the encoders 51a to 51e, and inputs these errors to the servo amplifiers 47a to 47e. This varies the output target torque of the minor loops in the servo amplifiers 47a to 47e.

In the above configuration, the first servomotor 31, the first servo amplifier 47a, the first error amplifier 49a, the first encoder 51a, and the first torque sensor 53a will be collectively referred to as a first servo driver 41. The second servomotor 32, the second servo amplifier 47b, the second error amplifier 49b, the second encoder 51b, and the second torque sensor 53b will be collectively referred to as a second servo driver 42. The third servomotor 33, the third servo amplifier 47c, the third error amplifier 49c, the third encoder 51c, and the third torque sensor 53c will be collectively referred to as a third servo driver 43. The fourth servomotor 34, the fourth servo amplifier 47d, the fourth error amplifier 49d, the fourth encoder 51d, and the fourth torque sensor 53d will be collectively referred to as a fourth servo driver 44. The fifth servomotor 35, the fifth servo amplifier 47e, the fifth error amplifier 49e, the fifth encoder 51e, and the fifth torque sensor 53e will be collectively referred to as a fifth servo driver 45.

The travel control system of the stacker crane 1 further includes a linear sensor 59. The linear sensor 59 detects the absolute position of the stacker crane 1 with respect to a detection plate 57. The detection plate 57 is provided at each stopping position facing a shelf or station in the automated warehouse. The travel controller 39 can use the linear sensor 59 to accurately determine the absolute distance to the target stopping position, so in control to stop at the target stopping position, a deceleration pattern is produced according to the remaining distance determined by the linear sensor 59, and the servo amplifiers 47a to 47e are each controlled so as to eliminate error between the speed signals produced by the error amplifiers 49a to 49e and the speed signal determined by the encoders 51a to 51e.

A laser rangefinder capable of accurate position measurement and an encoder capable of rapidly ascertaining a position may be used in together, instead of using a linear sensor.

Figure 3:
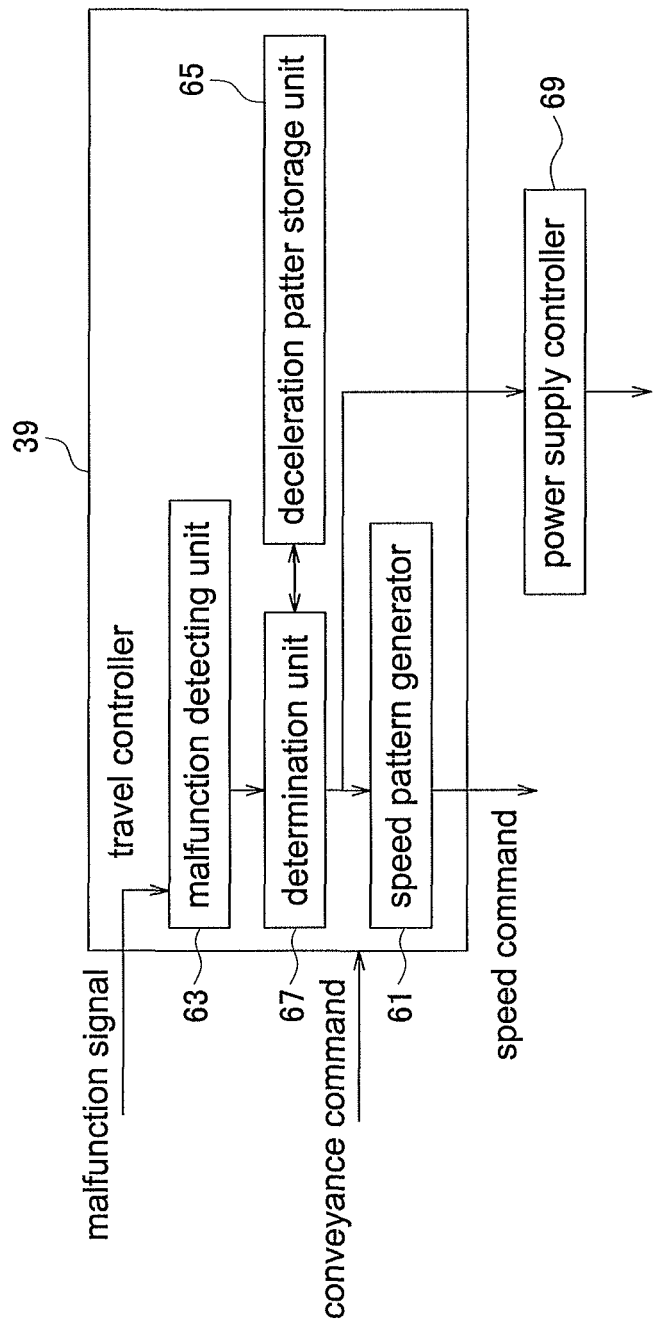
FIG. 3 is a block diagram of the function of a travel controller.

The function of the travel controller 39 will be described through reference to FIG. 3. FIG. 3 is a block diagram of the function of the travel controller.

Upon receiving a conveyance command from the vehicle controller 37, the travel controller 39 determines the distance from the current position obtained by the linear sensor 59 to the stopping position, and generates a travel deceleration pattern up to the stopping position.

The travel controller 39 includes a speed pattern generator 61, a malfunction detecting unit 63, a deceleration pattern storage unit 65, and a determination unit 67.

The speed pattern generator 61 generates a speed pattern and sends the servo drivers 41 to 45 speed commands based on the speed pattern.

The malfunction detecting unit 63 detects a malfunction with the servo drivers 41 to 45. More specifically, when a malfunction detection signal is sent from the malfunction detecting units 55a to 55e, the malfunction detecting unit 63 determines that there is a malfunction in the servomotor or servo amplifier corresponding to the malfunction detecting unit doing the sending.

The deceleration pattern storage unit 65 stores a deceleration pattern list 65a. The deceleration pattern list 65a preferably includes a plurality of deceleration patterns obtained by combining some of the servomotors 31 to 35.

Figure 4:
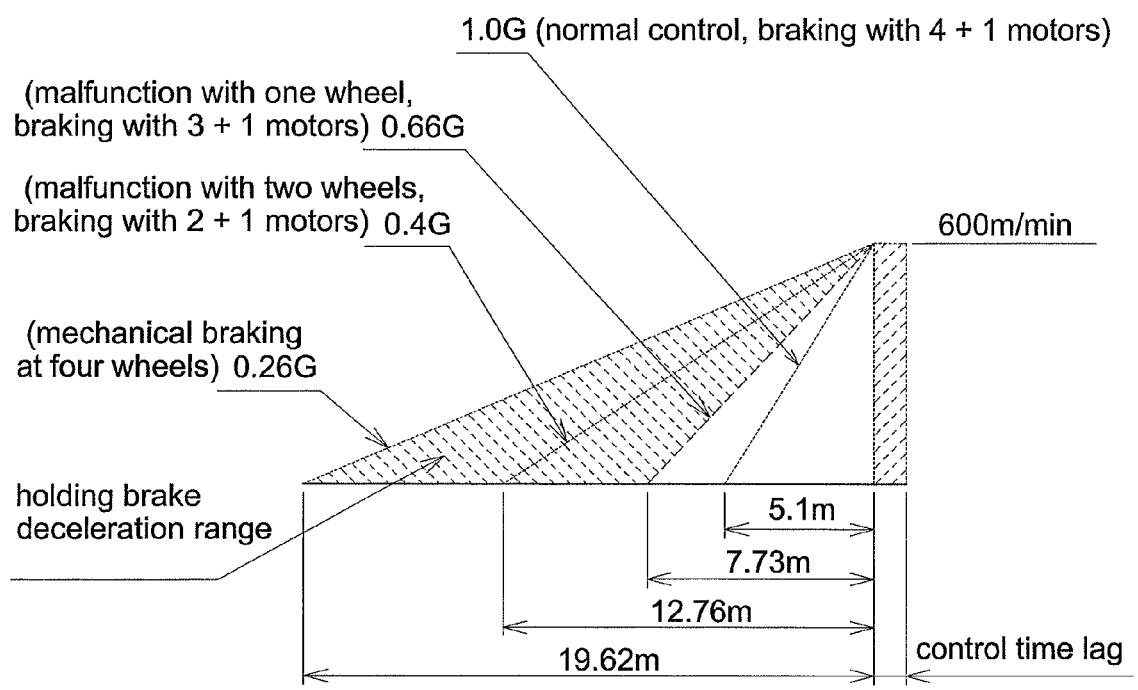
FIG. 4 is a graph of the deceleration and stopping distance when deceleration control is performed with some of the servomotors.

The deceleration obtained by deceleration control when a malfunction has occurred in a servo driver in this preferred embodiment will be described through reference to FIG. 4. In the following description, it is assumed that the stacker crane 1 travels at a speed of 600 m/minute, for example. In this preferred embodiment, the fifth servomotor 35 preferably includes the fifth brake 56e, but the fifth brake 56e is not actuated when travel stop control is performed by the first to fourth brakes 56a to 56e.

In ordinary control (when deceleration is controlled by five servomotors), the deceleration preferably is about 1.0 G and the travel distance until stopping preferably is about 5.1 m, for example. When there is a malfunction with one of the first to fourth servomotors 31 to 34 (when deceleration is controlled by four servomotors), the deceleration preferably is about 0.66 G and the travel distance until stopping preferably is about 7.73 m, for example. When there is a malfunction with two of the first to fourth servomotors 31 to 34 (when deceleration is controlled by three servomotors), the deceleration preferably is about 0.4 G and the travel distance until stopping preferably is about 12.76 m, for example.

Here, when the first to fourth brakes 56a to 56d are actuated, the deceleration preferably is about 0.26 G and the travel distance until stopping preferably is about 19.62 m, for example. If there is a malfunction with three of the first to fourth servomotors 31 to 34, the deceleration preferably is about 0.2 G, for example (not shown). It can be seen from the above that when there are two servo drivers with a malfunction, the deceleration is higher by deceleration control with the servo drivers, and when there are three servo drivers with a malfunction, the deceleration is higher when produced by the brakes incorporated into the servomotors.

The deceleration pattern list 65a will be described through reference to FIG. 5. FIG. 5 is a table of deceleration pattern lists. In the deceleration pattern list 65a is recorded the correspondence between an abnormal state of a servomotor and the deceleration that can be generated in that case. More specifically, in the deceleration pattern list 65a are recorded the decelerations that can be generated when there are two to four properly operating servomotors.

Figure 6:
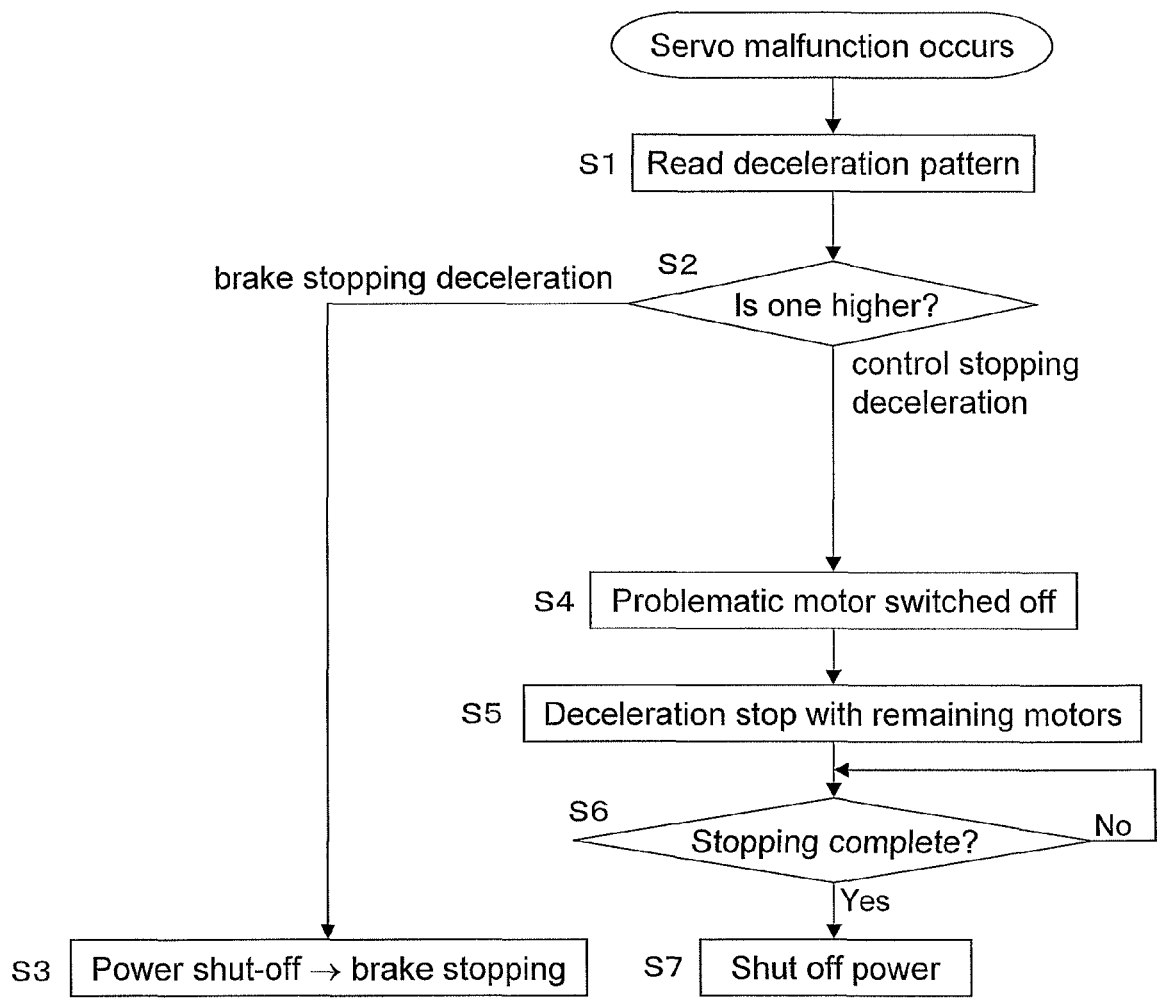
FIG. 6 is a flowchart of braking control when a malfunction has occurred in a servo driver.

The braking control when a malfunction has occurred in a servo driver will be described through reference to FIG. 6. FIG. 6 is a flowchart of braking control when a malfunction has occurred in a servo driver.

In step S1, if a malfunction signal is sent from the malfunction detecting unit 63, the determination unit 67 reads the deceleration that can be generated from the deceleration pattern list 65a in the deceleration pattern storage unit 65, on the basis of the number of servo drivers in which a malfunction has occurred.

In step S2, the determination unit 67 compares the deceleration of the deceleration that was read, with the deceleration produced by the first to fourth brakes 56a to 56d, and determines which one is higher. If the brake stopping deceleration is higher, the process moves to step S3, but if the control stopping deceleration is higher, the process moves to step S4.

As another example of step S2, a pattern in which the deceleration is less than the deceleration with mechanical braking is not stored, and it is determined that the deceleration with mechanical braking is higher if there is no registration.

In step S3, the determination unit 67 sends a shut-off signal to a power supply controller 69. As a result, the power supply controller 69 shuts off the power to the servomotors 31 to 34. At this point, the fifth brake 56e of the fifth servomotor 35 is maintained in an open state. As a result, the first to fourth brakes 56a to 56d perform braking. The reason for maintaining the open state of the fifth brake 56e of the fifth servomotor 35 is so that the mechanical structure will not be subjected to excessive load. In this preferred embodiment, if the fifth brake 56e is actuated at the same time, the brake torque of the fifth servomotor 35 will be too much higher than the brake torque of the other servomotors, so there will be too much imbalance in the brake torque.

In step S4, the travel controller 39 switches off the servo driver with the malfunction, while leaving the brake of the servomotor with a malfunction in an open state.

In step S5, the determination unit 67 sends this deceleration pattern to the speed pattern generator 61. The speed pattern generator 61 sends a speed command to a normal servo driver so that the deceleration specified by the deceleration pattern is realized.

In step S6, the travel controller 39 waits for the stacker crane 1 to stop. Once the stacker crane 1 stops, the process moves on to step S7.

In step S7, the determination unit 67 sends a shut-off signal to the power supply controller 69. As a result, the power supply controller 69 shuts off the power supply to the servomotors 31 to 34.

With this stacker crane 1, when the deceleration produced by mechanical brakes is higher than with deceleration control using a deceleration pattern, braking control is performed with the mechanical brakes. In other words, the stacker crane 1 can be stopped in the shortest possible distance for a given situation by selecting the braking element or brake capable of generating the highest deceleration in that situation.

The above preferred embodiment can be expressed as follows.

A travelling vehicle (such as a stacker crane 1) includes a vehicle main body (such as the travelling vehicle 11), a plurality of servomotors (such as the first to fifth servomotors 31 to 35), and a controller (such as the travel controller 39). The plurality of servomotors are travel motors that move the vehicle main body and include brakes. The controller is programmed to control the plurality of servomotors. The controller includes a malfunction detecting unit (such as the malfunction detecting unit 63) programmed to detect malfunction of the servomotors, and a deceleration pattern storage unit (such as the deceleration pattern storage unit 65) programmed to store a plurality of deceleration patterns based on combinations of some of the plurality of servomotors. When the malfunction detection unit detects malfunction of at least one of the servomotors, the controller excludes an abnormal servomotor with the malfunction as targets to be controlled, reads out a deceleration pattern including normal servomotors from the deceleration pattern storage unit, and then performs a brake control using the read-out deceleration pattern.

With this travelling vehicle, which travels with the help of a plurality of servomotors, when a malfunction occurs in one or more of the servomotors, the malfunctioning servomotor is no longer subject to deceleration control, a deceleration pattern including a combination of normal servomotors is read, and braking control is performed according to this deceleration pattern. Therefore, the travelling vehicle can be stopped safely and in a short distance.

A preferred embodiment of the present invention was described above, but the present invention is not limited to or by the above preferred embodiment, and various modifications are possible without departing from the gist of the present invention. In particular, the preferred embodiments and modification examples given in this specification can be combined as needed.

In the above preferred embodiment, a plurality of deceleration patterns preferably included only balanced deceleration patterns obtained by combining all of the servomotors except for those in which a malfunction had occurred. However, as another preferred embodiment, a plurality of deceleration patterns may include a balanced deceleration pattern including a combination of servomotors excluding any servomotor that is a source of imbalance when imbalance occurs laterally or longitudinally when we assume a combination of all the normal servomotors.

In this case, if a balanced deceleration pattern is read out from the memory, the controller performs deceleration control with the servomotors included in the balanced deceleration pattern, and switches off any servomotor that would cause imbalance in the drive of the vehicle main body. With this travelling vehicle, even a normal servomotor is excluded from braking control if it would result in imbalance, and this prevents the vehicle main body from being subjected to excessive load.

As an example, unlike in the above preferred embodiment, in FIG. 5, for instance, even though there are only two normal servomotors, the deceleration in deceleration control by servomotors is assumed to be higher than the deceleration produced by mechanical brakes. In this case, for example, if only the "first motor, third motor, and fifth motor" are normal, since the first and third motors are both disposed on the same side (left or right), deceleration control of the first and third motors will end up creating imbalance to the left and right. In view of this, even though the first motor and third motor are both normal, one of them is switched off in order to restore balance. Also, if, for example, only the "second motor, fourth motor, and fifth motor" are normal, since the second and fourth motors are both disposed on the same side (left or right), deceleration control of the second and fourth motors will end up creating imbalance to the left and right. In view of this, even though the second motor and fourth motor are both normal, one of them is switched off in order to restore balance.

In the above preferred embodiment, a stacker crane was used as an example of a travelling vehicle, but the present invention can also be applied to other types of travelling vehicle.

In the above preferred embodiment, the fifth servomotor preferably includes a brake, but it need not have a brake.

In the above preferred embodiment, there were a total of five servomotors, for example, but some other number may be used instead.

In the above preferred embodiment, the deceleration pattern was preferably divided up only by the number of servo systems in which a malfunction occurred, but there may be a deceleration pattern that specifies a servomotor in which a malfunction has occurred. This is effective when using servomotors having different characteristics.

In the above preferred embodiment, the travelling vehicle preferably made use of two servomotors to rotate one wheel, but the vehicle may instead make use of just one servomotor to rotate one wheel. For example, the travelling vehicle may be such that a servomotor is linked to each of four wheels (front and rear, left and right).

Also, the travelling vehicle may make use of one servomotor to rotate two wheels.

Preferred embodiments of the present invention can be broadly applied to travelling vehicles including a plurality of servomotors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A travelling vehicle, comprising:
a vehicle main body;
a plurality of servomotors configured to move the vehicle main body, each of the servomotors including a mechanical brake; and
a controller configured and programmed to control the servomotors; wherein
the controller includes:

a malfunction detection unit configured and programmed to detect malfunction of the servomotors; and a deceleration pattern storage unit configured and programmed to store a plurality of deceleration patterns including a combination of a portion of the servomotors among the plurality of the servomotors; wherein when the malfunction detection unit detects malfunction of at least one of the servomotors, the controller is configured and programmed to exclude an abnormal servomotor with the malfunction as targets to be controlled, read out one of the plurality of deceleration patterns including normal servomotors from the deceleration pattern storage unit, and then perform a brake control using either the one of the plurality of deceleration patterns or the mechanical brakes, the controller is configured and programmed to compare a deceleration value based on the one of the plurality of deceleration patterns with a deceleration value based on the mechanical brakes, the controller is configured and programmed to select either deceleration control using the mechanical brakes or deceleration control using the one of the plurality of deceleration patterns, according to which of the mechanical brakes and the one of the plurality of deceleration patterns generates a higher deceleration, and the controller is configured and programmed to perform the brake control using only the selected one of the deceleration control using the mechanical brakes and the deceleration control using the one of the plurality of deceleration patterns.

2. The travelling vehicle according to claim 1, wherein the plurality of deceleration patterns include a balanced deceleration pattern including a combination of the servomotors other than a servomotor causing unbalance of travelling of the vehicle main body; and in a case that the controller reads out the balanced deceleration pattern from the deceleration pattern storage section, the controller is configured and programmed to perform the brake control using servomotors included in the balanced deceleration pattern, while excluding the servomotor causing unbalance of the travelling of the vehicle main body as targets to be controlled.

3. A travelling vehicle, comprising:

a vehicle main body;

a plurality of servo-drivers, each of which includes a servomotor to move the vehicle main body and a servo-amplifier corresponding to the servomotor, each of the servomotors includes a mechanical brake; and a controller configured and programmed to control the servo-drivers; wherein the controller is configured and programmed to read out one of the plurality of deceleration patterns including normal servo-drivers when receiving signals indicating malfunction of the servo-drivers;

the controller is configured and programmed to compare a deceleration value based on the one of the plurality of deceleration patterns with a deceleration value based on the mechanical brakes;

the controller is configured and programmed to activate the mechanical brakes by shutting off power of the servomotors if the deceleration value based on the mechanical brakes is higher than the deceleration value based on the one of the plurality of deceleration patterns, such that only the mechanical brakes are used to perform a brake control; and the controller is configured and programmed to turn off the servomechanism of an abnormal servo-driver with the malfunction while keeping the mechanical brake of the servomotor included in the abnormal servo-driver in a released state, and to generate a speed instruction defined by the one of the plurality of deceleration patterns if the deceleration based on the one of the plurality of deceleration patterns is higher than the deceleration value based on the mechanical brakes, such that only the one of the plurality of deceleration patterns is used to perform the brake control.

* * * * *